United States Patent [19]

Hutt et al.

[11] 4,284,751

[45] Aug. 18, 1981

[54] POLYURETHANE SEALANT SYSTEM

[75] Inventors: Jack W. Hutt, Tarzana; Fernando E. Blanco, Arleta, both of Calif.

[73] Assignee: Products Research & Chemical Corp., Burbank, Calif.

[21] Appl. No.: 149,586

[22] Filed: May 14, 1980

[51] Int. Cl.$^3$ .................... C08G 18/10; C08G 18/80
[52] U.S. Cl. .................... 528/45; 427/301; 427/387; 428/425.5; 428/429; 528/55; 528/58; 528/59
[58] Field of Search ............ 528/45, 55, 58, 59; 428/425.5, 429; 427/301, 387; 428/425.5, 429

[56] References Cited

U.S. PATENT DOCUMENTS

| 3,235,518 | 2/1966 | Hostettler et al. | 528/55 |
|---|---|---|---|
| 3,437,622 | 4/1969 | Dahl | 428/355 |
| 3,453,243 | 7/1969 | Hartlein | 528/39 |
| 3,779,794 | 12/1973 | De Santis | 428/425.8 |
| 3,947,426 | 3/1976 | Lander | 528/45 |
| 4,096,291 | 6/1978 | Dunwald et al. | 528/45 |
| 4,154,638 | 5/1979 | Frany et al. | 428/425.5 |
| 4,203,875 | 5/1980 | Garner et al. | 528/58 |

FOREIGN PATENT DOCUMENTS 54-126297 10/1979 Japan .

*Primary Examiner*—Maurice J. Welsh
*Attorney, Agent, or Firm*—Poms, Smith, Lande & Rose

[57] ABSTRACT

A polyurethane sealant including a polyurethane having terminal isocyanate groups and containing a dual curing catalysti of organic bismuth and organic tin, said polyurethane being the reaction product of a liquid poly (lower) alkylene polyol having a molecular weight of 6,000 or more and three to five hydroxyl groups and a sterically unhindered aromatic diisocyanate. The polyurethane sealant may be used in conjunction with a silane based primer and when applied to glass surfaces provides a high strength and rapidly curing seal.

29 Claims, No Drawings

POLYURETHANE SEALANT SYSTEM

BACKGROUND OF THE INVENTION

Inasmuch as fast room temperature curing, single component sealants and adhesives are desirable and useful, particularly in original equipment manufacturing, it is not surprising that a number of one component elastomeric sealants are now available in the marketplace. Such sealants include various polymer bases such as polysulfides, mercaptan terminated polyethers, polysiloxames and polyurethanes.

Certain industries need elastomeric adhesives or sealants which cure by exposure to ambient conditions and which will develop a high tensile strength. Applications of this type include sealing automobile windshields which are often intended as structural components in design. For these applications the elastomeric sealant or adhesive must not only have high tensile strength but should achieve such strength in a matter of a few hours so that the automobile may be safely driven shortly after installation of the windshield.

Of the various liquid elastomers available today, cured polyurethanes, in general, have the highest mechanical strength and therefore are the polymers of choice as a windshield sealant or adhesive provided that the adhesive or sealant can cure rapidly under ambient conditions without exhibiting other problems such as foaming, storage instability, depolymerization, etc..

An example of a one component, room temperature, moisture curing polyurethane sealant is disclosed in U.S. Pat. No. 3,779,794 wherein a polyurethane sealant in combination with a particular type of silane primer is disclosed. In that patent, the polyurethane sealant is an isocyanate terminated polyethylene ether diol-polypropylene ether triol combination having from 1.2 to 1.5% free isocyanate terminals. These terminals are blocked with a volatile blocking agent which, when exposed to air, evaporates and the moisture in the air cures the polyurethane. The polyurethane sealant disclosed in this patent in combination with the silane primer cures, according to the patent, to a tensile strength of 40-60 pounds per square inch (psi) after 6 hours exposure at 77° F. and 30% relative humidity. Although such sealants are satisfactory in terms of ultimate elongation characteristics and the like, nevertheless, there is a need for the development of a sealant having higher early strength, i.e. 100 psi or more in a six hour period of time, with equivalent ultimate elongation.

SUMMARY OF THE INVENTION

It is therefore a primary object of the present invention to disclose and provide polyurethane sealant systems for use in bonding glass and/or metal in combination with a silane based primer, said polyurethane sealant systems having extremely fast cure rates when exposed to ambient moisture to produce high strength seals within six hours without sacrificing elongation characteristics and other desirable features.

The present invention is based upon the surprising discovery that one component room temperature curing, stable polyurethane sealants having extremely rapid cure rates and high early strengths are produced by incorporating a dual catalyst system of certain organic tin and bismuth salts in a polyurethane sealant produced by using sterically unhindered aromatic isocyanates to terminate liquid poly (lower) alkylene ether polyols having functionalities between three to five (i.e., poly(-lower)alkylene ethers with three to five terminal functional hydroxyl groups per molecule) and molecular weights above about 6,000 together with a volatile blocking agent to block the isocyanate groups. A threefold improvement in 6 hours ambient tensile strengths are found compared with the teachings of U.S. Pat. No. 3,779,794.

The polyurethanes produced with the dual catalyst organic tin and bismuth salts have very high tensile strengths, i.e. 100 psi and greater, in six hours after exposure to ambient moisture and temperature. Because of the ultimate higher strength, the polyurethane sealants of this invention allow higher extensions with plasticizers thereby reducing the cost and still meet all the ultimate performance characteristics of automobile manufacturers.

The polyurethane sealants of the present invention contain a free isocyanate content of not greater than about 2.0 weight percent and, in general, it can be said that the sealants of the present invention will have a free isocyanate content of from about 0.5 weight percent to about 2 weight %.

The general procedure for producing the polyurethane sealant is to prepare a mixture of the polyol, fillers and plasticizers. This mixture should be substantially free of moisture, e.g. the mixture should not contain more than about 0.06 weight % water. To the dry mixture is added the sterically unhindered aromatic diisocyanate and the tin catalyst, the amount of diisocyanate added being sufficient so that the diisocyanate reacts with all the hydroxyl groups present in the polyol and any water residue present and has a free isocyanate content of not greater than about 2 weight %, for example 0.5 to 2.0 weight %, based on the weight of polyurethane polymer. The organic tin salt catalyst is added because in addition to promoting the curing of the polyurethane sealant upon exposure to moisture, it also promotes the reaction between the isocyanate group and the hydroxyl group. Thereafter, the free isocyanate groups are blocked by adding a volatile blocking agent in an amount about equal to, or slightly less than, the moles of free isocyanate in order to prevent further reaction of the isocyanate groups.

After the blocking reaction is completed, the organic bismuth salt catalyst is added in a catalytic effective amount. It is preferred to add the bismuth catalyst after the reaction between the polyol and diisocyanate has occurred.

Exemplary of the poly(lower) alkylene ether polyols useful in our invention there may be mentioned poly(-lower) alkylene ether triols, tetrols, pentols, and mixtures thereof. Preferred poly(lower)alkylene ether polyols are polypropylene ether triols, tetrols, pentols, or mixtures thereof.

The poly(lower) alkylene polyols having three to five hydroxyl groups used in making the polyurethane sealants of the present invention are liquid and will have molecular weight of 6,000 or greater, for example, the molecular weight may range from 6,000 to as high as 20,000 or 30,000 providing that the triol, tetrol, or pentol is liquid.

The polypropylene ether triols of the present invention are known in the art and therefore no detailed exemplification will be given. Such polypropylene ether triols may be made by the addition of propylene oxide to trimethylol propane or 1,2,6 hexane triol as disclosed in U.S. Pat. No. 3,437,622.

The polypropylene ether tetrols and pentols used in this invention may be made in the following manner: For the tetrol, two moles of polypropylene ether triol are reacted with one mole of a diisocyanate (either hindered or unhindered) such as tolylene diisocyanate by mixing the two reactants together followed by heating for 6 hours at 70° C. The pentol is made in the same manner by reacting three moles of the triol with two moles of the diisocyanate followed by heating.

The isocyanate which is reacted with the polyols to form the polyurethanes of the present invention may be any sterically unhindered aromatic diisocyanate, e.g. aromatic diisocyanates having no substituent on the aromatic ring ortho to either isocyanate group. (Toluene diisocyanate is not satisfactory since the methyl group hinders the final reactivity of the polymer). Exemplary of isocyanates useful in this invention are diphenyl methane diisocyanate, biphenyl diisocyanate, diphenyl ethane diisocyanate, etc.. As noted above, it is important that enough isocyanate be utilized to have a free isocyanate content in the resulting completed sealants of from about 0.5 weight % to 2 weight %.

As noted, to prevent the free isocyanate groups from further reacting there is added a volatile blocking agent in an amount about equal to the equivalents of free isocyanate groups present. This volatile blocking agent is displaced by the ambient moisture during curing and therefore should be volatile at room temperature. These blocking agents are known in the art and are described in detail in the following:

(1) S. Petersen, Annalen der Chemie, 562, 205 (1949)

(2) F. R. Griffin and L. J. Willworth, Ind. Eng. Chem. Proced. Res. Develop. 1, 265 (1962)

(3) Canadian Patent 722, 764 (Nov. 30, 1965)

Included are tautomeric enols such as di(lower) alkyl malonates.

In order to rapidly obtain high tensile strength upon exposure to moisture the polyurethanes of this invention must contain a dual catalyst of organic tin and bismuth compounds. The organic tin compounds may have the following formula

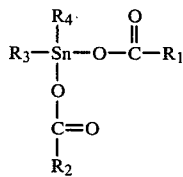

wherein each of $R_1$ and $R_2$ are alkyl of from 1 to 11 or 12 carbon atoms and each of $R_3$ and $R_4$ are lower alkyl. Exemplary of organic tin compounds are dibutyl tin dilaurate and dibutyl tin diacetate. The amount of organic tin compound present is not particularly critical provided it is present in a catalytic curing effective amount which may vary from about 0.1 weight % to about 1 weight % based on the weight of the polyol.

The other compound of the dual catalyst is a bismuth organic compound such as bismuth tri-(2-ethyl hexoate) and bismuth tri-neo-decanoate). As is the case with the organic tin compound a catalytic curing effective amount must be present in the polyurethane which, for example, may vary from about 0.1 weight % to about 0.6 weight % calculated as bismuth and based on the weight of the polyol.

For maximum activity and reproducibility it is preferred that the organic tin salt of the dual catalyst be added after the pigments have been blended with the polyol and combined with the diisocyanate. It has been also found beneficial to restrict the addition of the bismuth compound until completion of the isocyanate reaction and blocking of the free isocyanate groups with the volatile blocking agent.

It is noted that the use of the two curing catalysts is critical in the present invention since the use of only one does not give satisfactory results regardless of the amounts used. Likewise the use of unhindered aromatic isocyanates is important in achieving extremely rapid cures. For example, when using only the organic tin compound, the polyurethane will have a tensile strength in six hours at 77° F. and 30% R.H. of about 50 psi and using only the bismuth compound results in a six hour tensile strength of about 30 psi with a resulting material having little elastomeric qualities. Surprisingly, when using the dual catalyst system, tensile strength well in excess of 100 psi regularly result after six hours cure. The polyurethane sealant also contains inert fillers and plasticizers so as to impart desired application and physical properties to the polyurethane composition. Inert fillers which may be used in this invention are silicates, carbonates, such as calcium carbonate, and carbon black. The fillers may be present in amounts of 200 weight %, for example, 50 weight % to 200 weight %, all such weight percentages being based upon the weight of the polyurethane.

The polyurethane sealants of this invention also preferably contain a plasticizer which is inert to the isocyanate groups and compatible with the polyurethane. Such plasticizers are known in the art and include esters such as dioctyl phthalate, phosphates such as tricresyl phosphate, aromatic hydrocarbon oils and various chlorinated paraffins. The plasticizer may be present in amounts up to 100 weight % based on the weight of the polyurethane.

The resulting polyurethane sealant may be used in conjunction with any silane based primer having isocyanate reactive groups so that the primer can react with the free isocyanate groups in the polyurethane sealant to form high strength, rapid curing seals between for example, glass and metallic surfaces. Isocyanate reactive groups include amine, epoxy, mercaptan, isocyanate and urea. Particular preferred silant based primers having isocyanate reactive groups are the silane-isocyanate primers such as those disclosed in U.S. Pat. No. 3,453,243. In this patent there are described primers which are the reaction product of an isocyanate with a silane and which contain isocyanate reactive groups. The particularly preferred silane based primer in the present invention is the reaction product of mercaptopropyl trimethoxy silane with 2,2,4-trimethyl hexamethylene diisocyanate. The primer composition of the present invention also preferably contains fillers such as carbon black and also are disclosed in an organic solvent such as ethyl acetate and the like to form a dilute solution thereof. In addition, a film forming resin binder should also be present, such resins being known in the art. For example, chlorinated rubber can be used such as those obtainable from ICI (e.g. Alloprene 4-20) having a molecular weight of 5,000 to 20,000 and a chlorine content of about 65%. Other film forming resins are polyester based polyurethanes having a molecular weight of about 20,000 and commercially available under the trademark Desmodur RS.

The primer composition may also contain a catalytic effective amount of a catalyst which will catalyze the hydrolysis of silane when exposed to ambient moisture so that the silane will form a high strength bond with the glass or metal substrate. Such catalysts are known in the art and include catalysts which accelerate the reaction between isocyanates with compounds having an active hydrogen such as various tertiary amines but preferably compounds of heavy metals of Group I or Group II of the periodic table such as stannous octoate, stannous laurate, lead naphthenate, etc.. The amount of such catalyst is not critical and may range from 0.1 weight % to from 1 to 5 weight % based on the silane compound.

As noted, the silane based primers are known in the art and improve the adhesion of polyurethane polymers to glass and metals. In the installation of windshield sealants, the primer will be applied to the glass and the painted or partially painted car body. Sealant is then laid down on top of the primed car surface and the primed windshield pressed into place.

Both the primer and polyurethane sealant are placed in separate containers which are moisture-proof since both the primer and polyurethane sealant cure upon exposure to ambient moisture.

In order to more fully describe the present invention the following examples are given.

EXAMPLE 1

This example uses only the organic tin curing catalyst and does not form a part of this invention but is for comparison purposes only.

The following components were used in this example:

| Compound | Parts by Weight |
| --- | --- |
| Polypropylene ether triol | 100 |
| Silica | 25 |
| Calcium Carbonate | 30 |
| Carbon black | 38 |
| Diisodecyl phthalate (plasticizer) | 30 |
| Diphenyl methane diisocyanate | 14.2 |
| Dibutyl tin dilaurate | 0.1 |
| Diethyl malonate | 2.3 |

The triol used in the above example was polypropylene ether triol having a molecular weight of about 6,500, commercially available under the trademark Olin "Poly G 85-28".

A dry mixture (i.e. containing less than 0.06 weight % water) of the triol, fillers and plasticizer is prepared and temperature of the mixture adjusted to 120° F. The diisocyanate is then added to the mixture and then the tin catalyst. When the exotherm reached 140° F., the diethyl malonate was added to stop the exotherm and block the free isocyanate groups remaining. The resulting composition had a viscosity of 450 poises.

EXAMPLE 2

This example uses only the organic bismuth compound and is for comparison purposes only.

The following components were used in this example:

| Compound | Parts by Weight |
| --- | --- |
| Polypropylene ether triol | 100 |
| Silica | 25 |
| Calcium Carbonate | 30 |
| Carbon Black | 38 |
| Diisodecyl phthalate | 30 |
| Diphenyl methane diisocyanate | 14.2 |
| Diethyl malonate | 2.3 |
| Bismuth tri-2-ethyl hexyl phthalate (8.2% Bi) | 4.0 |

The organic bismuth compound was an 8.2 weight % solution, calculated as bismuth, in mineral spirits. The triol used in this example is the same polypropylene ether triol used in Example 1. A dry mixture of triol, fillers, plasticizer is prepared and the temperature adjusted to 120° F. and the diisocyanate is added to the mixture. The reaction mixture is heated at 140° F. until the reaction is complete. The diethyl malonate is then added followed by the addition of the bismuth catalyst. The resulting composition had a viscosity of 480 poises.

EXAMPLE 3

This example demonstrates polyurethane sealants in accordance with the present invention. The bismuth tri(2-ethyl hexoate) is added as an 8.2 weight % solution, calculated as bismuth, in mineral spirits. The triol used is the same as in Examples 1 and 2.

The following components were used in this example:

| Compound | Parts by Weight |
| --- | --- |
| Triol | 100 |
| Silica | 25 |
| Calcium Carbonate | 30 |
| Carbon Black | 38 |
| Plasticizer (didecyl phthalate) | 32 |
| Diphenyl Methane Diisocyanate | 14.2 |
| Dibutyl Tin Dilaurate | 0.1 |
| Diethyl Malonate | 2.3 |
| Bismuth tri-2-ethyl hexoate) | 4.0 |

A dry mixture of the triol, fillers and plasticizer is prepared, the temperature of the mixture adjusted to 120° F. and the diisocyanate and tin salt added as in Example 1 when the exotherm reaches 140° F. the malonate is added and, after the reaction is complete, the bismuth catalyst is added. The resulting sealant has a viscosity of 450 poises.

EXAMPLE 4

This is another example of polyurethane sealant of the present invention. The bismuth catalyst is identical to Examples 2 and 3.

The following components were used:

| Compound | Parts by Weight |
| --- | --- |
| Tetrol (see below) | 100 |
| Silica | 25 |
| Calcium Carbonate | 37 |
| Carbon Black | 35 |
| Plasticizer (didecyl phthalate) | 30 |

| Compound | Parts by Weight |
|---|---|
| Diphenyl Methane Diisocyanate | 9.3 |
| Dibutyl Tin Dilaurate | 0.1 |
| Diethyl Malonate | 2.3 |
| Bismuth tri-2-ethyl hexoate | 4.0 |

The tetrol used in this example is polypropylene ether tetrol formed by reacting two moles of the triol of Example 1 with one mole of tolylene diisocyanate in the presence of a trace of dibutyl tin dilaurate (about 0.05% on the weight of triol) and heating at 150° F. until no free-isocyanate is left. The resulting tetrol has a molecular weight of about 13,000 and a hydroxyl number of about 17. A dry mixture of tetrol, fillers, plasticizer is prepared and the temperature adjusted to 120° F. and the diisocyanate is added to the mixture. When the exotherm reaches 140° F. the diethyl malonate is added and when the reaction is completed the bismuth catalyst is added. The resulting composition had a viscosity of 480 poises.

EXAMPLE 5

The preferred silane base primer of this invention uses the following compounds:

| Compound | Parts by Weight |
|---|---|
| Ethyl Acetate | 72 |
| Carbon Black | 7 |
| Film Forming Resin (Desmodur RS) | 12.5 |
| 2,2,4-trimethylhexamethylene Diisocyanate | 0.8 |
| Mercaptopropyl Trimethoxy Silane | 3 |
| Dibutyl Tin Dilaurate | 0.2 |

The diisocyanate, silane and catalyst are charged to a reactor and the temperature raised to 140° F. and the reaction allowed to proceed for from one to two hours. The temperature is then lowered to ambient and the remaining ingredients added and mixed to form a homogeneous dispersion.

EXAMPLE 6

In order to demonstrate the high tensile strength achieved in six hours by the polyurethane sealants of this invention, particularly when compared to the strengths of the polyurethane composition of Examples 1 and 2, the following tests were conducted:

The primer of Example 5 was applied to four glass panels approximately 4"×4" in a strip along the sides of each panel approximately one inch wide. Thereafter, each of the polyurethane compositions of Examples 1, 2, 3 and 4 were laid, respectively, on the primer and on top of the polyurethane compositions was embedded a painted metal strip ½ inch wide and 4 inches long. After six hours the metal strip were torn off to measure the tensile strength of the bond. The tensile strengths were as follows: Example 1, 50 psi; Example 2, 30 psi; Example 3, 100 psi; and Example 4, 120 psi.

In order to demonstrate the ultimate elongation of the compositions of Examples 3 and 4 they were allowed to remain in place for twenty-one days, after they were initially mixed and after standing in moisture-proof containers for three months. The tests were conducted in accordance with ASTM D 412-75 and the results are given in the following table

|  | Initial | | 3 Months | |
|---|---|---|---|---|
|  | Ex. 3 | Ex. 4 | Ex. 3 | Ex. 4 |
| Ultimate Elongation | 700% | 650% | 750% | 600% |

It is to be understood that the foregoing Examples are for the purpose of illustration only and are not to be considered limiting.

What is claimed is:

1. A polyurethane sealant which when exposed to ambient moisture will cure rapidly to form a seal having high tensile strength consisting essentially of
(A) a polyurethane polymer containing terminal isocyanate groups in an amount of not more than about 2.0 weight % based on the weight of said polyurethane, said terminal isocyanate groups being blocked to prevent further reaction by a volatile blocking agent, said polyurethane polymer being the reaction product of (1) a liquid poly (lower) alkylene ether polyol having a molecular weight of greater than about 6,000 and from three to five hydroxyl groups with (2) a sterically unhindered aromatic diisocyanate; (B) a catalytic curing effective amount of (a) an organic bismuth salt selected from the group consisting of bismuth tri-(2-ethyl hexoate) and bismuth tri-(neo-decanoate) and (b) an organic tin salt of the formula:

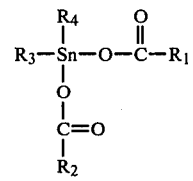

wherein each of $R_1$ and $R_2$ is alkyl of from 1 to 12 carbon atoms and each of $R_3$ and $R_4$ are lower alkyl; (C) up to 200 weight %, based on the weight of the polyol, of inert fillers: and (D) up to 100 weight %, based on the weight of the polyol, of polyurethane compatible plasticizers.

2. A polyurethane sealant according to claim 1 wherein the liquid polyol has a molecular weight of between about 6,000 and 30,000.

3. A polyurethane sealant according to claim 1 wherein the amount of organic bismuth compound is from about 0.1 weight % to about 0.6 weight %, calculated as bismuth and based on the weight of the polyol.

4. A polyurethane sealant according to claim 3 wherein the organic bismuth compound is bismuth tri-(2-ethyl hexoate).

5. A polyurethane sealant according to claims 1 or 3 wherein the organic tin compound is present in an amount of from about 0.1 weight % to about 1 weight % based on the weight of the polyol.

6. A polyurethane sealant according to claim 5 wherein the organic tin compound is dibutyl tin dilaurate.

7. A polyurethane sealant according to claim 1 wherein said poly(lower) alkylene ether polyol is a polypropylene ether polyol.

8. A polyurethane sealant system which when exposed to ambient moisture will cure rapidly to form a seal having high tensile strength comprising
(A) a liquid polyurethane sealant consisting essentially of (1) a polyurethane polymer containing terminal isocyanate groups in an amount of not more than about 2.0 weight % based on the weight of said polyurethane, said terminal isocyanate groups being blocked to prevent further reaction by a volatile blocking agent, said polyurethane polymer being the reaction product of (i) a liquid poly(lower) alkylene ether polyol having a molecular weight of greater than about 6,000 and from three to five hydroxyl groups, (ii) a sterically unhindered diisocyanate;
(2) a catalytic curing effective amount of (a) an organic bismuth compound selected from the group consisting of bismuth tri-(2-ethyl hexoate) and bismuth tri-neo-decanoate and (b) an organic tin compound of the formula:

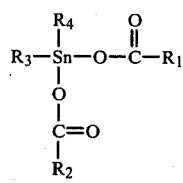

wherein each of $R_1$ and $R_2$ is alkyl of from 1 to 12 carbon atoms and each of $R_3$ and $R_4$ are lower alkyl; (3) up to 200 weight %, based on the weight of the polyol, of inert fillers; and (4) up to 50 weight %, based on the weight of the polyol, of polyurethane compatible plasticizers and
(B) a silane based primer composition which is rapidly curable in the presence of ambient moisture and consisting essentially of (1) a silane compound having isocyanate reactive groups and (2) a catalytic effective amount of a silane hydrolysis catalyst.

9. A polyurethane sealant system according to claim 8 wherein the liquid polyol has a molecular weight of between about 6,000 and 30,000.

10. A polyurethane sealant system according to claim 8 wherein the volatile blocking agent is a tautomeric enol.

11. A polyurethane sealant system according to claim 10 wherein the volatile blocking agent is a di(lower)alkyl malonate.

12. A polyurethane sealant system according to claim 8 wherein the silane hydrolysis catalyst promotes the reaction of an isocyanate with an active hydrogen.

13. A polyurethane sealant system according to claim 12 wherein said catalyst for promoting the reaction of an isocyanate with an active hydrogen is a compound of a heavy metal Group I or Group II of the periodic table.

14. A polyurethane sealant system according to claim 8 wherein the amount of organic bismuth compound is from about 0.1 weight % to about 0.6 weight %, calculated as bismuth and based on the weight of the polyol.

15. A polyurethane sealant system according to claim 4 wherein the organic bismuth compound is bismuth tri-(2-ethyl hexoate).

16. A polyurethane sealant according to claims 8 or 14 wherein the organic tin compound is present in an amount of from about 0.1 weight % to about 1 weight % based on the weight of the polyol.

17. A polyurethane sealant system according to claim 16 wherein the organic tin compound is dibutyl tin dilaurate.

18. A polyurethane sealant system according to claim 8 wherein said poly(lower) alkylene either polyol is a polypropylene ether polyol.

19. A method for forming a high tensile strength seal on a glass substrate which comprises priming said glass substrate which is exposed to ambient moisture with
(A) a silane based primer composition which is rapidly curable in the presence of ambient moisture and consisting essentially of (1) a silane compound having isocyanate reactive groups and (2) a catalytic effective amount of a silane hydrolysis catalyst and applying over said silane base primer
(B) a liquid polyurethane sealant consisting essentially of (1) a polyurethane polymer containing terminal isocyanate groups in an amount of not more than about 2.0 weight % based on the weight of said polyurethane, said terminal isocyanate groups being blocked to prevent further reaction by a volatile blocking agent, said polyurethane being the reaction product of (i) a liquid poly(lower) alkylene ether polyol having three to five hydroxyl groups and a molecular weight of greater than about 6,000 and (ii) a sterically unhindered aromatic diisocyanate; (2) a cataytic curing effective amount of (a) an organic bismuth compound selected from the group consisting of bismuth tri-(2-ethyl hexoate) and bismuth tri-neo-decanoate and (b) an organic tin compound of the formula:

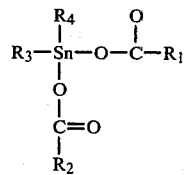

wherein each of $R_1$ and $R_2$ is alkyl of from 1 to 12 carbon atoms and each of $R_3$ and $R_4$ is lower alkyl; (3) up to 200 weight %, based on the weight of the polyol of inert filler and (4) up to 50 weight %, based on the weight of the polyol, of polyurethane compatible plasticizers.

20. A method according to claim 19 wherein the liquid polyol has a molecular weight of between about 6,000 and 30,000.

21. A method according to claim 19 wherein the volatile blocking agent is a tautomeric enol.

22. A method according to claim 21 wherein the volatile blocking agent is a di(lower) alkyl malonate.

23. A method according to claim 19 wherein the silane hydrolysis catalyst promotes the reaction of an isocyanate with an active hydrogen.

24. A method according to claim 23 wherein said catalyst for promoting the reaction of an isocyanate with an active hydrogen is a compound of a heavy metal of Group I or Group II of the periodic table.

25. A method according to claim 19 wherein the amount of organic bismuth is from about 0.1 weight % to about 0.6 weight %, calculated as bismuth and based on the weight of the polyol.

26. A method according to claim 25 wherein the organic bismuth compound is bismuth tri-(2-ethyl hexoate).

27. A method according to claims 23 or 25 wherein the organic tin compound is present in an amount of from about 0.1 weight % to about 1 weight % based on the weight of the polyol.

28. A method according to claim 27 wherein the organic tin compound is dibutyl tin dilaurate.

29. A method according to claim 19 wherein said poly(lower) alkylene ether polyol is a polypropylene ether polyol.

* * * * *

Disclaimer and Dedication

4,284,751.—*Jack W. Hutt*, Tarzana; *Fernando E. Blanco*, Arleta, both of Calif. POLYURETHANE SEALANT SYSTEM. Patent dated Aug. 18, 1981. Disclaimer and Dedication filed Dec. 18, 1989, by the assignee, Essex Chemical Corporation.

Hereby disclaims and dedicates to the Public the remaining term of said patent.
[*Official Gazette April 10, 1990* ]